United States Patent [19]

Szechenyi

[11] Patent Number: 5,271,037
[45] Date of Patent: Dec. 14, 1993

[54] LINE EQUIPMENT FOR THE COMPENSATION OF CROSSTALK

[75] Inventor: Kalman Szechenyi, Spiegelberg, Fed. Rep. of Germany

[73] Assignee: Alcatel N.V., Amsterdam, Netherlands

[21] Appl. No.: 772,918

[22] Filed: Oct. 10, 1991

[30] Foreign Application Priority Data

Oct. 10, 1990 [DE] Fed. Rep. of Germany ....... 4032067

[51] Int. Cl.$^5$ .......................... H03H 7/30; H03H 7/40
[52] U.S. Cl. ..................................... 375/14; 375/102; 379/417
[58] Field of Search .................. 375/14, 102; 379/417, 379/410

[56] References Cited

U.S. PATENT DOCUMENTS

| | | | |
|---|---|---|---|
| 4,606,054 | 8/1986 | Amitay et al. | 375/102 |
| 4,649,505 | 6/1987 | Zinser, Jr. et al. | 375/14 X |
| 4,688,245 | 8/1987 | Schenk | 379/410 |
| 4,757,319 | 7/1988 | Lanki | 375/102 X |
| 5,023,620 | 6/1991 | Matsuura | 375/102 X |
| 5,136,612 | 8/1992 | Bi | 375/102 X |

FOREIGN PATENT DOCUMENTS 0144067 6/1985 European Pat. Off. .
3343584 6/1985 Fed. Rep. of Germany .

OTHER PUBLICATIONS

Szechenyi, Kalman et al., "Integrated Full-Digital U-Interface Circuit for ISDN Subscriber Loops", IEEE Journal on Selected Areas in Communications, vol. SAC-4, No. 8, Nov. 1986, pp. 1337-1349.
Honig et al., "Multichannel Signal Processing for Data Communications in the Presence of Crosstalk," 8089 IEEE Transactions on Communications 38 (1990) Apr., No. 4 pp. 551-558.

Primary Examiner—Curtis Kuntz
Assistant Examiner—Bryon E. Webster
Attorney, Agent, or Firm—Spencer, Frank & Schneider

[57] ABSTRACT

Line equipment, preferably a line terminating device, in a communications system including transmitting and receiving circuits to which are connected transmitting lines and receiving lines includes at least one receiving circuit that is equipped with a circuit arrangement for compensating crosstalk. A single circuit arrangement effects the compensation of crosstalk between a plurality of transmitting lines and a receiving line. For compensation, a reference signal of the transmitted signal is branched off from each transmitting circuit and an adaptive filter simulates a compensation signal. The individual compensation signals are mixed into the received signals through the subtraction inputs of a subtraction circuit. Part of the output signal of the subtraction circuit is fed to the control signal inputs of the adaptive filters, the other part is processed further to become the received signal.

10 Claims, 3 Drawing Sheets ns from the respective reference signals, and a subtraction circuit for subtracting a sum of the compensation signals from a received signal of the receiving circuit and producing an output control signal for the adaptive filters.

One advantage of the invention is that the number of lines employed in a transmission cable can be increased since no blind lines are required any longer to suppress crosstalk.

Further advantages and features of the invention are defined in the claims and described in the remainder of the specification.

LINE EQUIPMENT FOR THE COMPENSATION OF CROSSTALK

CROSS REFERENCE TO RELATED APPLICATION

This application claims the priority of application Ser. No. P 4,032,067.7, filed Oct. 10, 1990, in the Federal Republic of Germany, the subject matter of which is incorporated herein by reference.

BACKGROUND OF THE INVENTION

The present invention relates to a circuit arrangement for the compensation of crosstalk in a digital communications system, particularly to line equipment including transmitting and receiving circuits. Compensation of crosstalk from a transmitting to a receiving circuit for one subscriber is disclosed in DE 3,343,584.A1, however the features of the present invention relating to the compensation of crosstalk from transmitting circuits to receiving circuits of different subscribers are novel.

In line-bound electrical communications some of the signals are transmitted over pairs of conductors that are combined in a line cable. In a four-wire transmission the outgoing and the incoming line are disposed in one and the same cable perhaps even in a star-quad arrangement within the cable. Depending on subscriber density, a large number of transmission lines are accommodated in such a cable and, due to the cable configuration, they are subject to crosstalk. Such interference has an adverse effect on the communications and, particularly if the transmission of digital signals between data processing devices is involved, may lead to errors in signal content.

A known way to suppress crosstalk in a cable is to utilize only some of the lines for the transmission and/or to adjust the occupation of the lines in a cable by trial and error until a minimum amount of crosstalk is obtained.

Such methods are very expensive and do not systematically result in crosstalk suppression.

DE 3,343,584.A1 discloses a crosstalk compensation circuit between an outgoing and incoming subscriber line. In this prior art circuit, part of the transmitted signal is branched off and a compensation signal is obtained by way of an adaptive filter and an inverter and is then added to the signal received by the subscriber.

This prior art circuit has the drawback that it is able to compensate only for the crosstalk existing between the outgoing and incoming lines of an associated transmitting and receiving device provided for two-way communication.

SUMMARY OF THE INVENTION

It is now an object of the present invention to provide a circuit arrangement which at least partially suppresses annoying crosstalk in a transmission cable between more than two lines.

This is accomplished in a line terminating device in a communication system, an arrangement including at least one receiving circuit having a receiving line and means for compensating crosstalk, a plurality of transmitting circuits which output corresponding reference signals for the at lease one receiving circuit, the reference signals being branched off from transmitted signals generated by transmitting circuits, each means for compensating crosstalk having an adaptive filter for each reference signal to derive respective compensation sig-

BRIEF DESCRIPTION OF THE DRAWINGS

Three embodiments of the invention will b described below, with reference to two drawing figures. It is shown in.

DETAILED DESCRIPTION OF THE PREFERRED EMBODIMENTS

Figure 1:
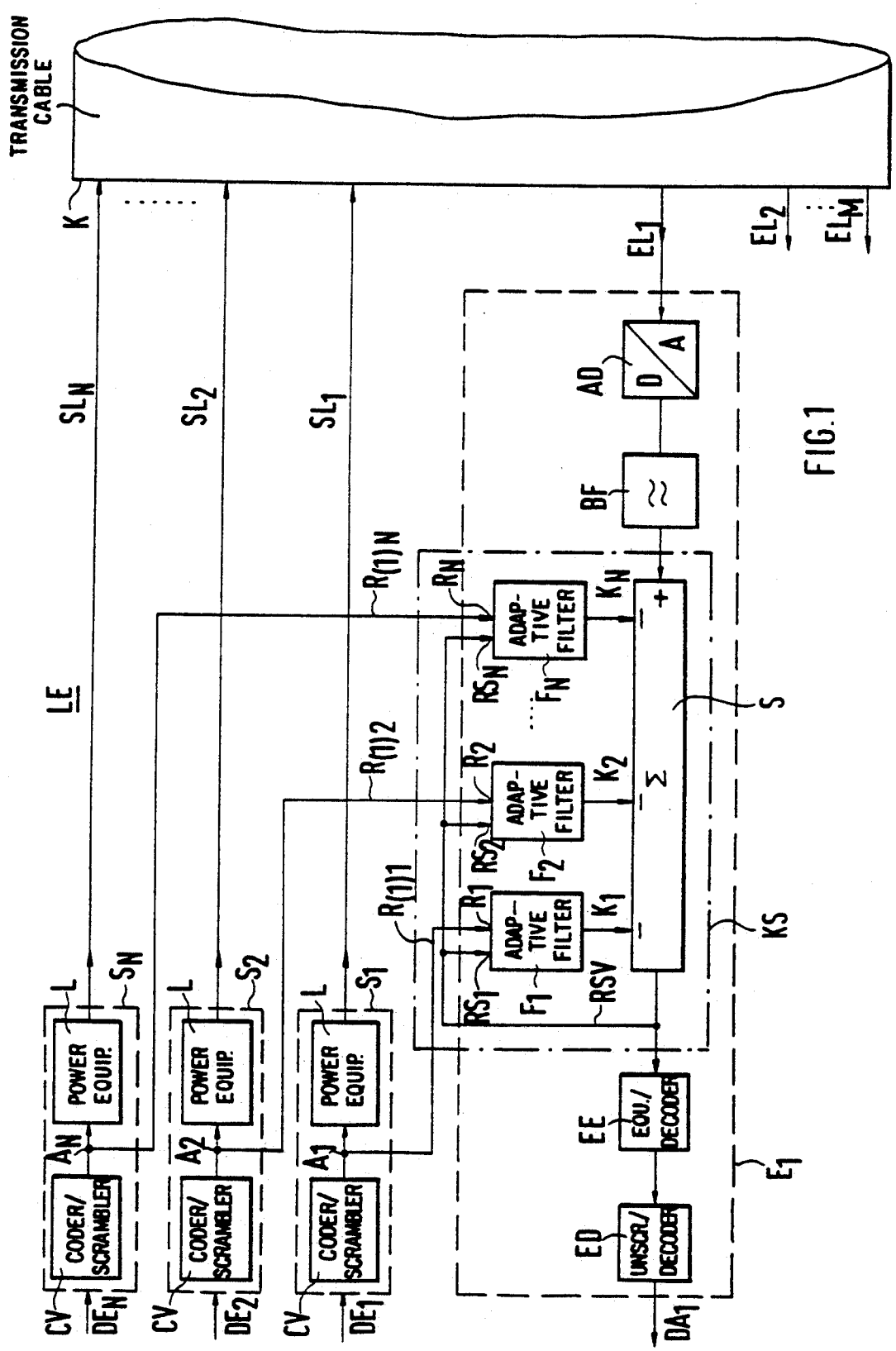
FIG. 1, the line equipment according to a first embodiment of the invention.

FIG. 1 shows a line terminating device LE for a plurality of subscribers in a digital communications system including a crosstalk compensation circuit KS and, indicated schematically only, a transmission cable K. The left half of FIG. 1, at the top, shows three transmitting circuits $S_1$, $S_2$, $S_N$, having respective data inputs $DE_1$, $DE_2$ and $DE_N$, representing N transmitting circuits and the lower half of the figure shows a receiving circuit $E_1$ representing M receiving circuits. The number N of transmitting circuits $S_1$ to $S_N$ and the number M of receiving circuits ($E_1$ to $E_M$) are generally not the same because of the different types of subscribers. Transmission cable K is indicated along the right margin of FIG. 1. Transmitting circuits $S_1$ to $S_N$ are connected with two-conductor transmission lines $SL_1$ to $SL_N$ and the receiving circuits with two-conductor receiving lines $EL_1$ to $EL_N$ which are part of transmission cable K. The connections $R_{(1)1}$, $R_{(1)2}$, $R_{(1)N}$ between transmitting circuits $S_1$ to $S_N$ and receiving circuit $E_1$ represent the connections between transmitting circuits $S_1$ to $S_N$ with receiving circuit $E_1$ and will hereinafter be called the reference line $R_{(1)1}$, and correspondingly the other two illustrated connections are called reference lines $R_{(1)2}$ and $R_{(1)N}$. The signals present in the reference lines are called the reference signals and are given the same reference numerals as the corresponding reference lines.

Receiving circuit $E_1$ includes a number of adaptive filters $F_1$, $F_2$, $F_N$ corresponding to the number of transmitting circuits $S_1$, $S_2$, $S_N$, with the signal inputs $R_1$, $R_2$, $R_N$ of these filters each being connected by way of the corresponding reference line $R_{(1)1}$, $R_{(1)2}$, $R_{(1)N}$ with a transmitting circuit $S_1$, $S_2$, $S_N$. The signal outputs $K_1$, $K_2$, $K_N$ of filters subtraction circuit S. Receiving line $EL_1$ is connected to the $N+1$ input, an adding input of subtraction circuit S. The output of subtraction circuit S is connected by way of a control signal connection RSV with the control signal inputs $RS_1$, $RS_2$, $RS_N$ of adaptive filters $F_1$ to $F_N$ and leads simultaneously, by way of a device which processes the output signal, to a data output $DA_1$.

In order to indicate which point within a transmitting circuit is connected by way of the above-mentioned reference lines with which points of the receiving circuit, each transmitting circuit is broken down as follows:

A first part CV includes a coder and a scrambler and a second part L includes the remaining components required for communication which here are called the power equipment L.

Receiving circuit $E_1$ includes, in addition to the components described above, an analog/digital converter AD, a bandwidth limiting filter BF, an equalizer and a decider, the latter two being disposed in a component EE, an unscrambler and a decoder disposed in a component ED. The compensation signals $F_1$, $F_2$, $F_N$ are added to the received signal at a corresponding location in receiving circuit $E_1$. In the first embodiment this means that the received signal is digitalized before it is fed to the adding input of subtraction circuit S and that it has passed through the bandwidth limiting filter. The output of subtraction circuit S is connected, by way of the equalizer and decider (component EE) and the unscrambler and decoder (component ED) with data output $DA_1$.

The reference signals $R_{(1)1}$, $R_{(1)2}$, $R_{(1)N}$ branched off from transmitting circuits $S_1$, $S_2$, $S_N$ are each fed as input signal to one of the adaptive filters $F_1$, $F_2$, $F_N$ of receiving circuit $E_1$. Adaptive filter $F_1$ simulates the crosstalk from signal line $SL_1$ to receiving line $EL_1$ to the extent that it originates from transmitting circuit $S_1$. The simulated signal, here called the compensation signal, is fed to a subtraction input of subtraction circuit S and in this way compensates the crosstalk from transmitting line $SL_1$ to receiving line $EL_1$. The regulation is effected by feedback-connecting the output signal of subtraction circuit S via control signal connection RSV to adaptive filter $F_1$. This simulation is effected in a known manner by the adaptive adjustment of the filter coefficients. The coefficients are determined by means of known algorithms. The purpose of setting the coefficients is to minimize the control signal. The principle of such an adjustment of filter coefficients is known to the person skilled in the art from DE 3,120,434.A1 or from IEEE Journal on Selected Areas in Communications, Vol. SAC-4, No. 8, November, 1986, pages 1337-1349, and is therefore not discussed here in greater detail. In one embodiment, the adaptive filters are transversal filters and each have at most five coefficients.

The compensation of crosstalk from the remaining transmitting lines $SL_2$ to $SL_N$ to receiving line $EL_1$ of receiving circuit $E_1$ is effected in the same manner as described above for transmitting line $SL_1$.

Since crosstalk is also a function of the power level of the transmitted signal and the lines between a line terminating device and outside plant equipment generally suffer high attenuation, crosstalk is primarily generated in the region near the line terminating devices.

For that reason, positive crosstalk suppression is of particular significance in the region near the line terminating device. The circuit arrangement KS for the compensation of crosstalk is therefore appropriately configured as a component of a line terminating device LE. In this way it can be integrated in line terminating device LE and can therefore be realized very economically. Even though the number of terminals of this circuit arrangement KS for the compensation of crosstalk is limited by this integration to the terminals of a line terminating device, the major portion of crosstalk is reliably compensated since generally only one line terminating device LE exists per house and crosstalk with the transmission lines of other subscribers occurs only, at the earliest, beginning at the next cable branch, for example, down the road or beginning with the next outside plant equipment.

However, it is certainly conceivable that not all transmitting circuits of a line terminating device LE are connected by way of the circuit arrangement KS for the compensation of crosstalk with one or all of the receiving circuits of line terminating device LE. Circuit arrangement KS may also be employed to compensate crosstalk between lines of different line terminating devices in that reference lines are disposed between the line terminating devices, with the compensation taking place as described above.

Instead of in the region of line terminating devices, circuit KS may also be disposed in the region of other line devices such as, for example, a line interface device.

Moreover, the use of circuit arrangement KS is not limited to the line equipment of a communications system but can also be employed in a branch exchange or in a computer system including a plurality of work stations, that is, anywhere where annoying crosstalk takes place between several lines.

Figure 2:
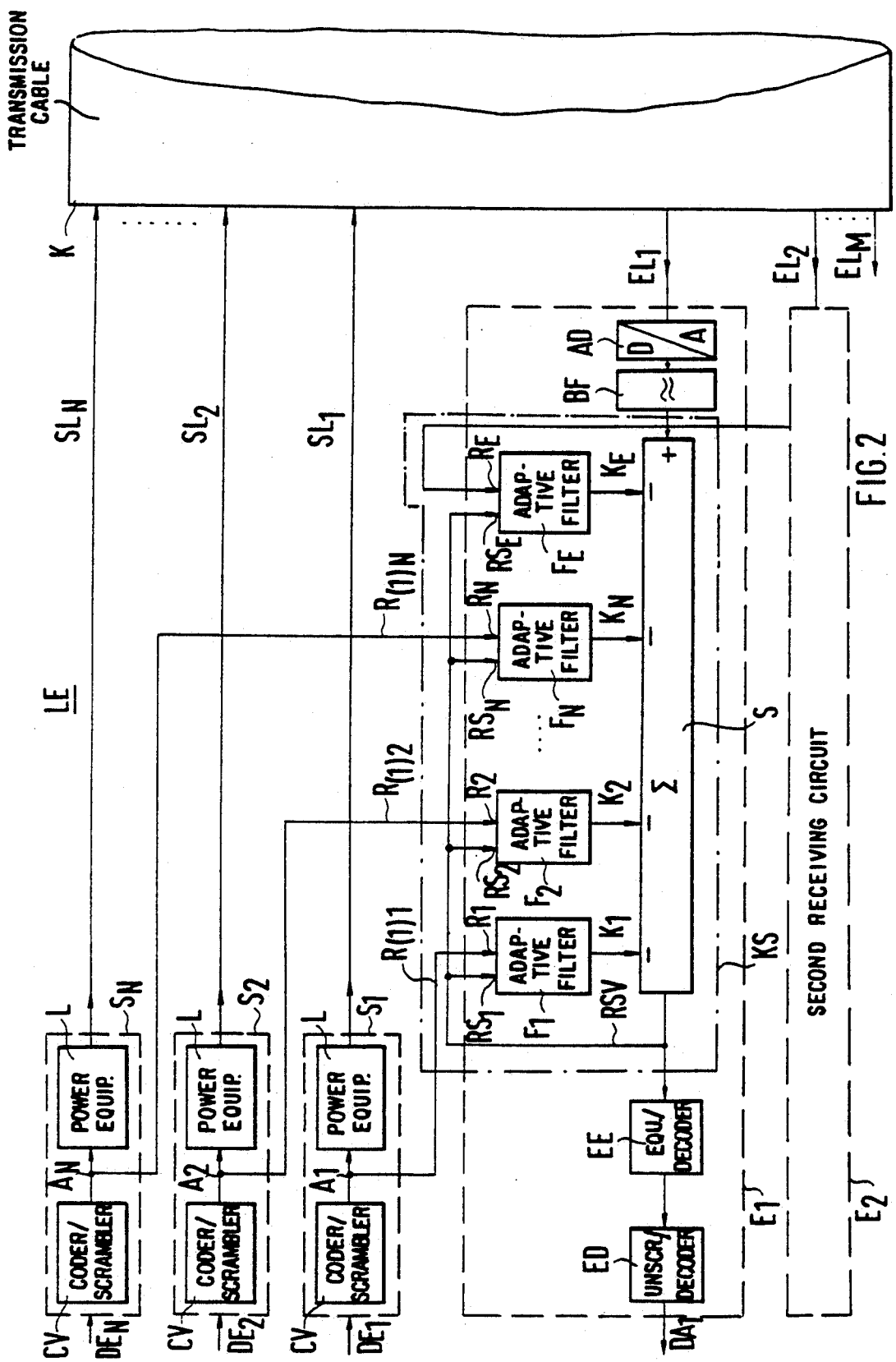
FIG. 2, a second, supplemented embodiment.

The first embodiment is limited to the compensation of crosstalk caused by transmitting circuits since, as described above, this is the primary type of interference. In a second embodiment, which is shown in FIG. 2, circuit arrangement KS for the compensation of crosstalk includes, as a modification to the configuration described as the first embodiment, a connection between receiving circuit $E_1$ and a second receiving circuit $E_2$. Receiving circuit $E_2$ is shown only schematically; it includes the same elements as receiving circuit $E_1$ and, like receiving circuit $E_1$ is connected with transmitting circuits $S_1$, $S_2$, $S_N$ by way of reference lines (not shown). Upstream of subtraction circuit S (not shown) a reference received signal $R_{(1)E}$ is branched off from the received signal of the second receiving circuit $E_2$ and is fed to the first receiving circuit $E_1$ in the same manner as reference signals $R_{(1)0}$ to $R_{(1)N}$ and is processed correspondingly via an additional filter $F_E$ so that an additional compensation signal $K_E$ is generated. In this way, crosstalk from the receiving line $EL_2$ of the second receiving circuit $E_2$ to the receiving line $EL_1$ of the first receiving circuit $E_1$ is also compensated. This is recommended, for example, if the second receiving circuit $EL_2$ is intended for transmission at a bit repetition rate of 2 Mbit/s or generally annoying crosstalk is to be expected from receiving line $EL_2$ to the first receiving line $EL_1$. If appropriate, crosstalk from further receiving lines can be compensated in the same manner.

In transmission cables in which some lines were utilized not for transmission but for the suppression of crosstalk, circuit arrangement KS for the compensation of crosstalk makes it possible to employ these lines for transmission as well. It further makes it possible for two lines which transmit at a bit repetition rate of 2 Mbit/s to be arranged in close proximity in a transmission cable without annoying crosstalk developing between these two lines.

Figure 3:
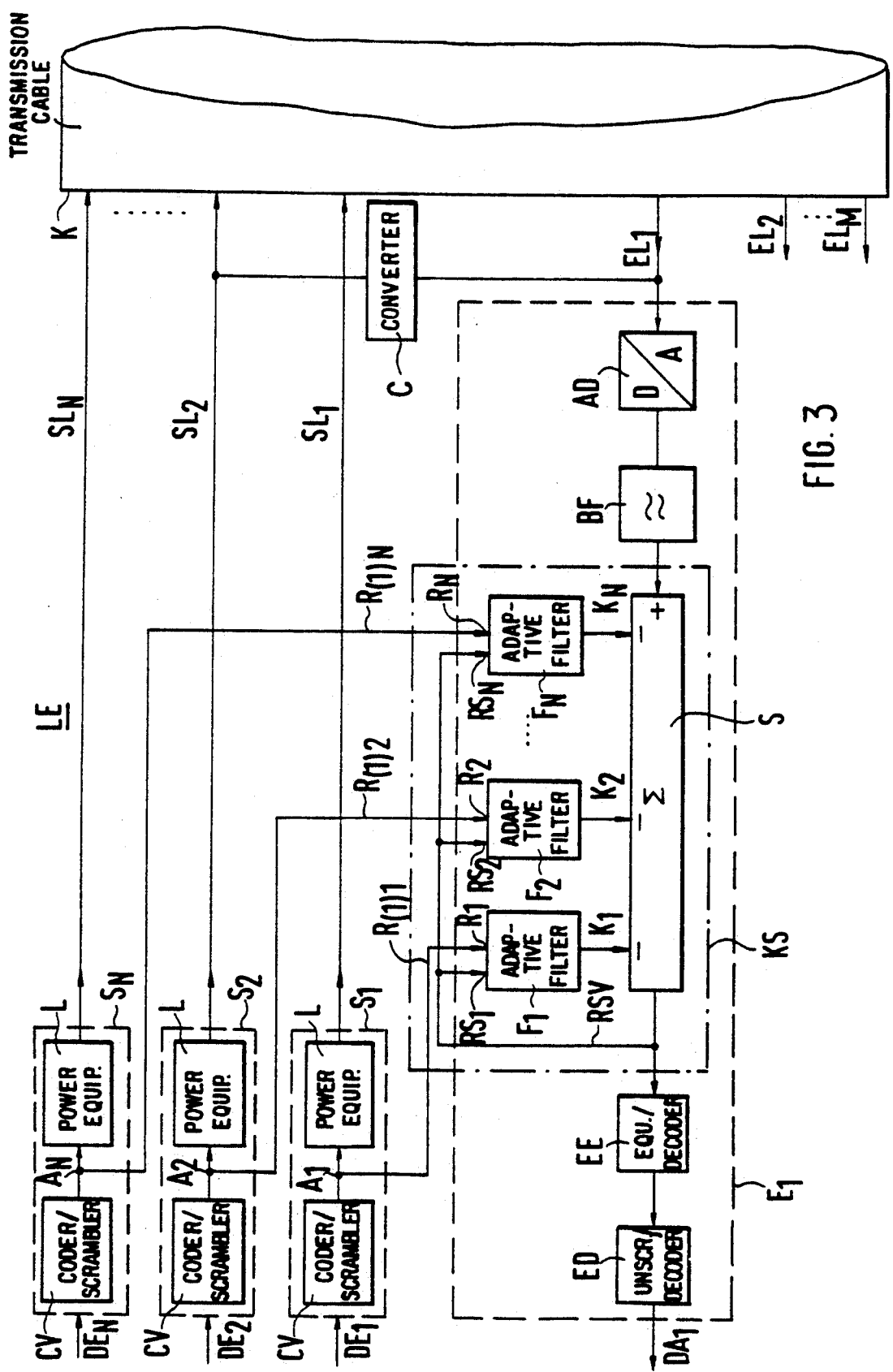
FIG. 3, a third embodiment.

Compared, to first two embodiments, a third embodiment, as shown in FIG. 3 additionally includes a device for compensating pulse noise. Such pulse noise may act on a transmission cable from the outside and also between lines within a transmission cable. It can therefore be compensated only conditionally by devices for compensating crosstalk.

In order to compensate pulse noise, a reference line is connected with the receiving line via a converter C. If now pulse noise appears within the cable, it is induced to the same extent in the reference line as in the receiving line. By way of the converter C, the reference pulse noise obtained from the reference line is fed to the receiving line at the subtraction input of a subtraction member and there compensates the pulse noise.

In the simplest case, the converter C may be composed of a line section; advantageously it includes an adaptive filter for generating a simulation signal.

A blind line included in the transmission cable may be employed as the reference line. If instead of the blind line a transmitting line or another one of the receiving lines is employed as the reference line, it is necessary to take an additional measure for compensating the transmitted or received signal present in these lines. For this purpose, the transmitted or received signal is simulated in a known manner by way of an adaptive filter and is then subtracted from the signal in a known manner, with the compensation signal for the suppression of pulse noise being derived therefrom.

It will be understood that the above description of the present invention is susceptible to various modifications, changes and adaptations, and the same are intended to be comprehended within the meaning and range of equivalents of the appended claims.

What is claimed is:

1. In a line terminating device in a communications system including transmitting and receiving circuits to which are connected transmitting lines, an arrangement comprising:
    at least one first receiving circuit which includes a receiving line and means for compensation crosstalk;
    a plurality of transmitting circuits which output corresponding reference signals for the at least one first receiving circuit that includes means for compensating crosstalk, said reference signals being branched off from transmitted signals generated by said transmitting circuits;
    wherein each means for compensating crosstalk includes: an adaptive filter for each reference signal to derive respective compensation signals from the respective reference signals; and a subtraction circuit which subtracts a sum of the compensation signals from a received signal of the receiving circuit, an output signal of the subtraction circuit being a control signal for the adaptive filters, the output signal being processed further to furnish an output signal of the receiving circuit; and
    wherein at least one second receiving circuit outputs to said at least one first receiving circuit a reference signal that is branched off from a signal received by the at least one second receiving circuit.

2. In a line terminating device in a communications system including transmitting and receiving circuits to which are connected transmitting lines, an arrangement comprising:
    at least one receiving circuit which includes a receiving line and means for compensating crosstalk;
    a plurality of transmitting circuits which output corresponding reference signals for the at least one receiving circuit that includes means for compensating crosstalk. said reference signals being branched off from transmitted signals generated by said transmitting circuits;
    wherein each means for compensating crosstalk includes: an adaptive filter for each reference signal to derive respective compensation signals from the respective reference signals; and a subtraction circuit which subtracts a sum of the compensation signals from a received signal of the receiving circuit, an output signal of the subtraction circuit being a control signal for the adaptive filters, the output signal being processed further to furnish an output signal of the receiving circuit; and
    wherein transmitting and receiving lines are conducted within a transmission cable together with the transmitting and receiving lines of other line devices, and the arrangement is connected by way of the means for compensating crosstalk with at least one of said other line devices and with at least one of the transmitting and receiving circuits contained therein.

3. The arrangement according to claim 1, wherein at least two transmitting and/or receiving circuits are provided which operate at a bit repetition rate of at least 2 Mbit/s.

4. The arrangement according to claim 1, wherein the adaptive filters are transversal filters and each have at most five coefficients.

5. In a line terminating device in a communications system including transmitting and receiving circuits to which are connected transmitting lines, an arrangement comprising:
    at least one receiving circuit which includes a receiving line and means for compensating crosstalk;
    a plurality of transmitting circuits which output corresponding reference signals for the at lease one receiving circuit that includes means for compensating crosstalk, said reference signals being branched off from transmitted signals generated by said transmitting circuits;
    wherein each means for compensating crosstalk includes: an adaptive filter for each reference signal to derive respective compensation signals from the respective reference signals; and a subtraction circuit which subtracts a sum of the compensation signals from a received signal of the receiving circuit, an output signal of the subtraction circuit being a control signal for the adaptive filters, the output signal being processed further to furnish an output signal of the receiving circuit;
    wherein:
    the receiving line of the at least one receiving circuit is connected with a reference line by way of a converter
    the reference line and the receiving line are arranged in such close proximity within a transmission cable that any pulse noise generated therein is induced approximately equally in both; and
    a compensation signal for the suppression of pulse noise in the receiving line is conducted by the converter to the receiving line.

6. The arrangement according to claim 5, wherein the converter includes an adaptive filter to simulate the pulse noise.

7. The arrangement according to claim 2, wherein at least two transmitting and/or receiving circuits are provided which operate at a bit repetition rate of at least 2 Mbit/s.

8. The arrangement according to claim 2, wherein the adaptive filters are transversal filters and each have at most five coefficients.

9. The arrangement according to claim 5, wherein at least two transmitting and/or receiving circuits are provided which operate at a bit repetition rate of at least 2 Mbit/s.

10. The arrangement according to claim 5, wherein the adaptive filters are transversal filters and each have at most five coefficients.

* * * * *